Dec. 2, 1947.   R. E. SINCLAIR   2,431,834
FOLDING WHEELBARROW
Filed April 24, 1944   2 Sheets-Sheet 1
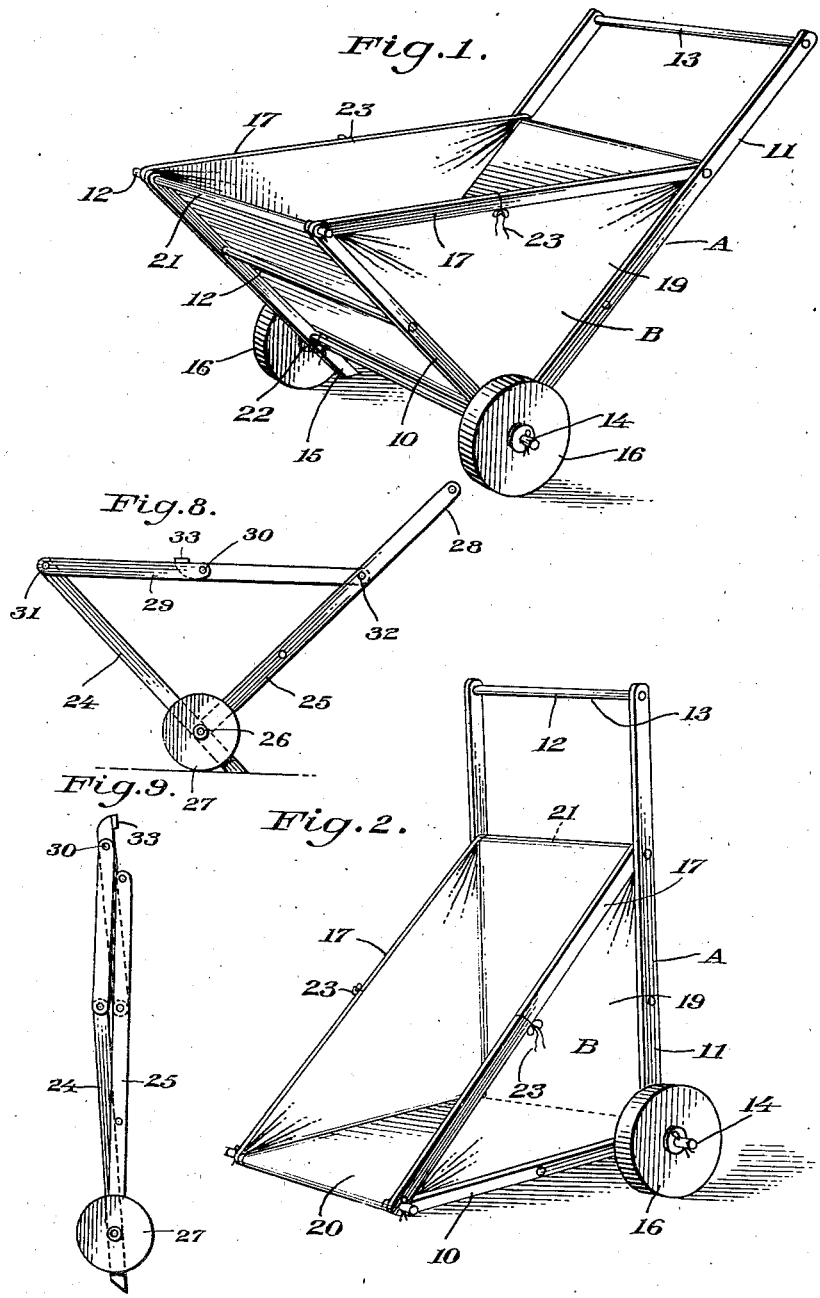
INVENTOR.
Robert E. Sinclair:
BY
Victor J. Evans & Co.
ATTORNEYS Dec. 2, 1947. R. E. SINCLAIR 2,431,834
FOLDING WHEELBARROW
Filed April 24, 1944 2 Sheets-Sheet 2
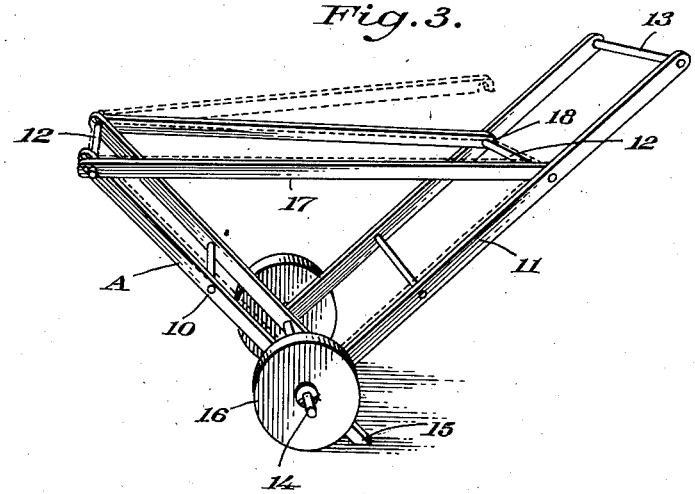
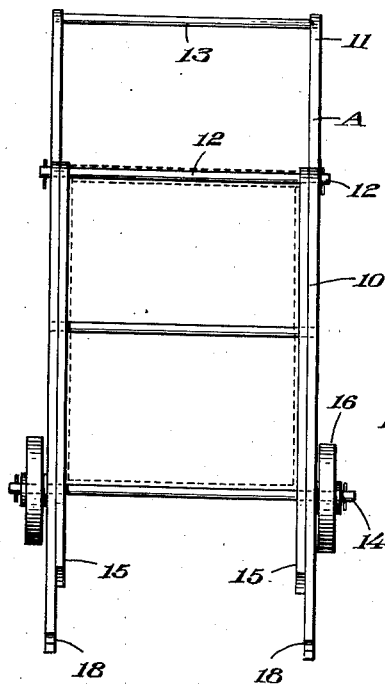
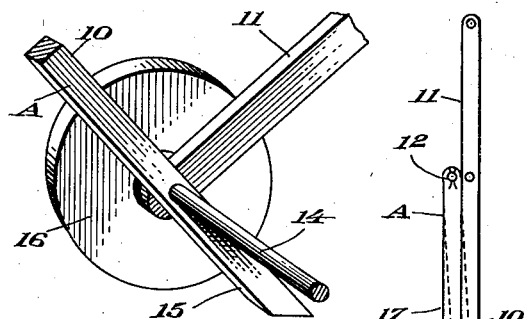
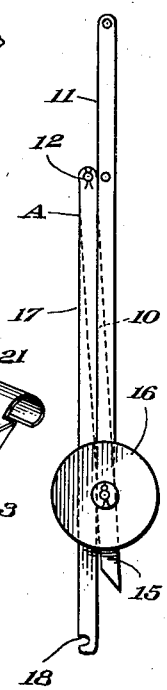
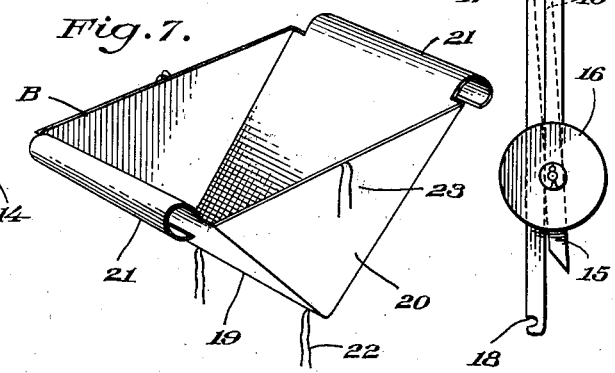
INVENTOR.
Robert E. Sinclair:
BY
Victor J. Evans & Co.
ATTORNEYS Patented Dec. 2, 1947

2,431,834

UNITED STATES PATENT OFFICE 2,431,834

FOLDING WHEELBARROW

Robert E. Sinclair, Yakima, Wash.

Application April 24, 1944, Serial No. 532,479

13 Claims. (Cl. 280—36)

The invention relates to a wheelbarrow, and more especially to a foldable wheelbarrow.

The primary object of the invention is the provision of a wheelbarrow of this character, wherein an extensible and collapsible container is removably fitted on a folding carriage having ground wheels, thus the entire set-up of the wheelbarrow is such to permit folding and unfolding thereof, thereby enabling the convenient storing of the same in the least possible space when not in use, or to allow for the easy transportation thereof.

Another object of the invention is the provision of a wheelbarrow of this character, wherein it can be positioned with respect to a ground surface, so that a user can rake material therein in an easy and convenient manner, it being self sustained in a receiving position, and further is adaptable for shopping purposes or otherwise.

A further object of the invention is the provision of a wheelbarrow of this character, which is simple in construction, thoroughly reliable and efficient in operation, strong, durable, readily and easily folded and unfolded with dispatch, light in weight, neat in appearance, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a perspective view of the wheelbarrow constructed in accordance with the invention and set up for use.

Figure 2 is a similar view showing the wheelbarrow in a self-sustained position on the ground.

Figure 3 is a perspective view with the basket body of the wheelbarrow removed, the said body being identified by dotted lines therein and similarly one of the side rails in a detached raised position.

Figure 4 is an elevation of the wheelbarrow in folded position.

Figure 5 is a fragmentary perspective view of the carriage portion in one adjusted position.

Figure 6 is a side edge view of the wheelbarrow in the position shown in Figure 4.

Figure 7 is a perspective view of the basket body removed from the carriage.

Figure 8 is a side view of a slight modification of the wheelbarrow, when the latter is set up.

Figure 9 is a view similar to Figure 8 showing the wheelbarrow folded.

Similar reference characters indicate corresponding parts throughout the several views in the drawings.

Referring to the drawings in detail, particularly Figures 1 to 7 inclusive, A designates generally the carriage and B, generally the basket body of the wheelbarrow constructed in accordance with the invention and hereinafter set forth.

The carriage A comprises a pair of swinging frames 10 and 11, respectively, with spaced cross rungs 12, the frame 11 being of greater length than the frame 10 and constitutes a handle bar 13 at its uppermost end. The lower portion of the frame 11 at its sides has fitted therein a transverse wheel axle 14, while the frame 10, removed from the lowermost portion thereof is fitted to the said axle 14, and the sides of the frame 10 at this lowermost portion create rest legs 15 for the carriage A. The axle 14 at the outer ends thereof has fitted thereto solid wheels 16 for ground contact to permit the carriage A to travel thereon when it is hand pushed or pulled.

The frames 10 and 11 swing toward and away from each other for folding and unfolding of the carriage A, and when the frames are swung away from each other they assume a substantially V-formation or relationship to one another, to effect a crotch into which is accommodated the basket body B.

On the uppermost cross rung 12 of the frame 10 are swingable side latch rails 17, the rung 12 being extended at its ends for this purpose, and these rails 17 are formed with hook-like latching terminals 18 adapted to detachably engage a rung 12 next to the uppermost thereof of the frame 11 to hold both frames in a spread relation to each other or in substantially V-shaped formation, as will appear in Figure 3 of the drawings by full lines thereof, to maintain the carriage in an unfolded set-up condition. The folded condition of the carriage A is shown in Figures 4 and 6, of the drawings, when the wheelbarrow is not in use.

The basket body B is made preferably from flexible material and includes the sides 19, substantially V-shaped ends 20, and rollable side flaps 21, at the uppermost portions of the sides 19, respectively. This body B is set within the crotch between the frames 10 and 11 when unfolded, while the bottommost portion of this body and midway of the ends 20 at their upper edges are tie cords, strings or the like 22 and 23, respectively, which are adapted to fasten the body B in place in the carriage A, the cords, strings or the like 23 are tied about the side rails 17, while the other cords, strings or the like 22 are tied to the axle 14. The flaps 21 are trained over the rungs 12 substantially in the plane therewith when the basket body B is arranged in the crotch between the frames 10 and 11. The flaps 21 may be detachably fastened in any desirable manner to the said rungs 12 or to the frames 10 and 11, which is optional.

The wheelbarrow carriage A is shown in Figure 1 of the drawings as a conveyance, while in Figure 2 the carriage is at rest and in a position for gathering materials from the ground, and in Figures 4 and 6, the wheelbarrow is shown in a folded condition for dis-use or storage in the least possible space when not in use or for convenient transportation thereof from one locality to another.

The legs 15 effect rests for the carriage A of the wheelbarrow when the latter is at a standstill.

In Figures 8 and 9 of the drawings, there is shown a slight modification of the invention, wherein the wheelbarrow construction involves the frames 24 and 25, respectively, which in their make-up are similar to the frames 10 and 11, and are hinged together by the axle 26 carrying the wheels 27, this assembly being identical to that of the said frames 10 and 11.

Swingingly connected to the uppermost end of the frame 24, and also swingingly connected to the frame 25 at a selected point below the uppermost handle end 28 of the latter are break-jointed side spreader rails 29, the break-joints therein being indicated at 30, while the swinging connections are denoted at 31 and 32, respectively.

At each break-joint 30 and formed with one of the sections of each rail 29 is an abutment or stop ear 33 which engages with the other section of this rail when both sections are brought into alignment with each other to hold them in such position to avoid downward sagging of these rails when maintaining the frames 24 and 25 in an unfolded relationship with respect to each other.

In other words, the abutment or stop ears 33 allow outward breaking action of the rails, but prevent inward breaking action thereof.

It should be seen that the rails and the frames of this modified form of wheelbarrow permits convenient folding and unfolding thereof without requiring the detachment of the rails 29 from the frames 24 and 25 for such purpose.

From the foregoing, it is thought that the construction and manner of operation of the invention will be clearly understood, and therefore a more extended explanation has been omitted.

Changes, variations and modifications may be made in the invention, as fall properly within the scope of the claims hereunto appended, without departing from the spirit of said invention or sacrificing any of its advantages.

What is claimed is:

1. A wheelbarrow of the kind described, comprising a pair of frames having cross rungs, an axle pivotally connecting said frames at their lower ends for folding and unfolding movements, a flexible substantially V-shaped basket-like body arranged between said frames and collapsibly hung thereby, ground engaging wheels journaled on the opposite ends of said axle, latching rails hingedly connected adjacent the upper end of one frame and detachably engaging a cross rung of the other frame for holding said frames in unfolded spread relation to each other, said latching rails and said frames in the unfolded condition forming an isosceles triangle conforming substantially to the shape of said basket-like body.

2. A wheelbarrow of the kind described, comprising a pair of frames, an axle pivotally connecting said frames together adjacent their lowermost portions, ground engaging wheels mounted on the opposite ends of said axle, adjustable side rails connected between corresponding opposite sides of said frames for foldably retaining said frames in an upwardly divergent relation to each other, and a flexible collapsible substantially V-shaped basket-like body suspended from the upper portions of said frames and said side rails.

3. A wheelbarrow of the kind described comprising a pair of rectangular frames, an axle pivotally connecting said frames together at their lowermost portions, adjustable side rails connected between corresponding opposite sides of said frames for foldably retaining said frames in an upwardly divergent relation to each other, said frames including cross rungs adjacent the opposite ends of said side rails, a flexible collapsible substantially V-shaped basket-like body attached to said cross rungs and said rails and depending wholly between said frames, and ground engaging wheels on the outermost ends of said axle outside of said frames.

4. A wheelbarrow of the kind described comprising a pair of rectangular frames, an axle pivotally connecting said frames together at their lowermost portions, one of said frames being longer than the other above said axle, break jointed side rails hingedly connected to the upper end portions of the opposite sides of the shorter frame and to points intermediate the ends of said longer frame, said side rails being adapted for foldably holding said frames in an upwardly divergent relation to each other, a flexible collapsible substantially V-shaped basket-like body suspended from said frames and said side rails, ground engaging wheels journaled on said axle, the upper end of said longer frame defining a handle for said wheelbarrow.

5. A wheelbarrow of the kind described comprising a pair of frames, an axle pivotally connecting said frames together at their lowermost portions, a first of said frames being longer than the other above said axle, the second of said frames being longer than the other below said axle, adjustable side rails connected to the upper end of said second frame and to intermediate portions of said first frame for foldably holding said frames in an upwardly divergent relation to each other, a flexible collapsible basket-like body suspended by said frames and said side rails, ground engaging wheels journaled on the opposite outer ends of said axle, the upper end of said first frame defining a handle for said wheelbarrow, the lowermost end of said second frame defining ground engaging rests for supporting said wheelbarrow in an upright position.

6. A wheeled carrier comprising a pair of flat rectangular frames, an axle extending through cooperating openings provided in the lower end portions of said frames about which said frames may be swung between a folded condition closely adjacent each other to an unfolded upwardly divergent condition, side rails extending between upper portions of said frames for foldably retaining said frames in said divergent condition, a collapsible receptacle suspended from said rails and upper portions of said frames, and ground engaging wheels mounted on opposite end portions of said axle.

7. A wheeled carrier comprising a pair of flat rectangular frames, an axle extending through cooperating aligned openings in the lower end portions of said frames, one of said frames being longer than the other above said axle, the second of said frames being longer than said one frame below said axle, side rails connected between the upper end of said second frame and intermediate portions of said first frame for foldably holding said frames in an upwardly divergent position, receptacle means secured to said rails and said frames, the upper end portion of said one frame defining a handle and the lowermost end portion of said second frame defining ground engaging rests for supporting said carrier in an upright position.

8. A wheeled carrier comprising a pair of flat rectangular wooden frames, one of said frames being slightly narrower than the other, and having its lower end extending between the opposite sides of the other frame, an axle extending through cooperating openings in the lower end portions of said frames about which said frames may be swung between a folded condition closely adjacent each other and an unfolded upwardly divergent condition, side rails extending between upper portions of said frames on each of the opposite sides thereof for foldably holding said frames in the divergent spread condition, and ground engaging wheels mounted on the opposite ends of said axle.

9. A wheelbarrow of the kind described, comprising a pair of frames, said frames being pivotally connected together adjacent their lowermost portions, ground engaging wheels mounted on the opposite sides of said frames adjacent said pivotal connection, adjustable side rails connected between corresponding opposite sides of said frames for foldably retaining said frames in an upwardly divergent relation with respect to each other, a flexible collapsible substantially V-shaped receptacle suspended from the upper portions of said frames, the bottom of said receptacle being secured adjacent the pivotal connection for said frames.

10. A wheelbarrow of the kind described, comprising a pair of frames, an axle pivotally connecting said frames together adjacent their lowermost portions, ground engaging wheels mounted on the opposite ends of said axle, adjustable side rails connected between corresponding opposite sides of said frames for foldably retaining said frames in an upwardly divergent relation to each other, a flexible collapsible substantially V-shaped receptacle suspended from the upper portions of said frames, the lowermost portion of said receptacle being secured to said axle.

11. A wheelbarrow of the kind described, comprising a pair of frames, said frames each including a plurality of cross rungs, an axle pivotally connecting said frames together adjacent their lowermost portions, ground engaging wheels mounted on opposite ends of said axle, adjustable rails connected between corresponding opposite sides of said frames for foldably retaining said frames in an upwardly divergent relation to each other, a flexible collapsible substantially V-shaped receptacle, a pair of opposite edge portions of said receptacle being secured to corresponding cross rungs on each of said frames, the lowermost portion of said receptacle being secured to said axle.

12. A wheelbarrow of the kind described, comprising a pair of frames, each of said frames including a pair of straight side members and a plurality of cross rungs extending therebetween, aligned openings in the lowermost portions of said side members of both of said frames, an axle pivotally connecting said frames together extending through said aligned openings, ground engaging wheels mounted on the opposite ends of said axle, adjustable side rails connected between corresponding opposite sides of said frames for foldably retaining said frames in an upwardly divergent relation to each other, said side rails normally extending substantially horizontally in the upright position of said wheelbarrow, said frames each including a cross rung at the opposite ends of said side rails, a flexible collapsible substantially V-shaped receptacle, the upper edge portions of said receptacle being secured to said last mentioned rungs and said side rails, the bottom of said receptacle being secured to said axle.

13. A wheelbarrow of the kind described comprising a pair of flat frames, each of said frames including a pair of straight opposite side members having a plurality of cross rungs extending therebetween, aligned openings through the lower end portions of said side members, an axle extending through said openings and pivotally connecting said frames together for folding and unfolding movements, ground engaging wheels mounted on each of the opposite ends of said axle, the first of said frames being longer than the other above said axle, the second of said frames being longer than the other below said axle, adjustable side rails operatively connected between the upper end corners of said second frame and correspondingly spaced intermediate points of said first frame, a flexible substantially V-shaped receptacle secured to said side rails and to cross rungs of said frames at each of the opposite ends of said side rails, said receptacle depending wholly between said frames, the lower end of said receptacle being secured to said axle, a cross rung at the upper end of said first frame defining a handle, the lower end portions of said second frame extending beyond the circumference of said wheels for engaging the ground therebehind and defining rests for supporting said wheelbarrow in an upright position.

ROBERT E. SINCLAIR.

REFERENCES CITED

The following references are of record in the file of this patent:

UNITED STATES PATENTS

| Number | Name | Date |
|---|---|---|
| 1,642,731 | Hagberg | Sept. 20, 1927 |
| 1,769,418 | Cooper et al. | July 1, 1930 |
| 1,702,015 | Mand | Feb. 12, 1929 |
| 2,052,803 | Schmoller | Sept. 1, 1936 |
| 771,134 | Erickson | Sept. 27, 1904 |
| 1,554,034 | Richie | Sept. 15, 1925 |
| 1,742,735 | Strippel | Jan. 7, 1930 |
| 1,718,962 | Kimball | July 2, 1929 |

FOREIGN PATENTS

| Number | Country | Date |
|---|---|---|
| 382,776 | Germany | Oct. 6, 1923 |
| 455,613 | Great Britain | Oct. 23, 1936 |
| 280,482 | Great Britain | Nov. 17, 1927 |
| 702,804 | Germany | Feb. 17, 1941 |